United States Patent

[11] 3,596,785

| [72] | Inventor | Tom M. Weatherford, Jr.<br>3726 Holliday Circle, Dallas, Tex. 75224 |
|---|---|---|
| [21] | Appl. No. | 840,710 |
| [22] | Filed | July 10, 1969 |
| [45] | Patented | Aug. 3, 1971 |

[54] DEVICE FOR LOADING AND UNLOADING OBJECTS
18 Claims, 6 Drawing Figs.

[52] U.S. Cl. .................................................. 214/89,
214/38 BA, 198/139
[51] Int. Cl. ............................................ B65g 15/26
[50] Field of Search .......................................... 214/89,
83.1, 83.24; 198/139, 124, 125; 271/77

[56] References Cited
UNITED STATES PATENTS

| 2,445,004 | 7/1948 | Reynolds et al. | 187/18 |
| 2,491,255 | 12/1949 | Edwards | 198/139 |
| 2,678,125 | 5/1954 | Bonney, Jr. | 198/139 |
| 2,815,849 | 12/1957 | Zumbrunnen | 198/139 |
| 2,927,705 | 3/1960 | Girardi | 214/83.1 |
| 3,402,805 | 9/1968 | Spellman, Sr. | 198/139 |

Primary Examiner—Albert J. Makay
Attorney—Arthur M Sloan

ABSTRACT: A telescoping continuous conveyor belt assembly is mounted in a compact unit. Wheels may be provided for portability to load and unload heavy objects from trucks and other vehicles. The device telescopes into a trailer or other remote location from a point outside the vehicle to be loaded or unloaded or removed from the remote location. By using pneumatic or hydraulic cylinders opposing each other, the slack is kept out of the conveyor belt. Pneumatic or hydraulic cylinder operated scissor-type cradles may be provided at each end of the belt conveyor to raise or lower the objects being loaded or unloaded as the operator desires. The device may be arranged on a pivot. Pneumatic or hydraulic cylinders may be provided at the end of the conveyor which is extended within the vehicle or to the remote location to automatically move the end of the belt to one side of the vehicle or the other or along an arc at the remote location as desired.

3,596,785

PATENTED AUG 3 1971

INVENTOR
TOM M. WEATHERFORD, JR.

*Arthur M. Sloo*

ATTORNEY

INVENTOR
TOM M. WEATHERFORD, JR.

ATTORNEY

DEVICE FOR LOADING AND UNLOADING OBJECTS

This invention relates to a device for loading and unloading objects such as sides of beef from trucks and other vehicles or from remote locations.

The invention includes a telescoping continuous conveyor belt. The device is mounted in a compact unit. Wheels may be provided for rolling the device to the end of the loading dock or other location.

Traditionally, in the meat industry, a van truck is backed up to the loading dock and strong, heavy-set men carry the beef into the truck and lift it onto the hooks to hang. This requires the services of several men. Men of the requisite physical capabilities are becoming more difficult to find. Wages are rising ever higher and back and other injuries are occurring more frequently causing increased insurance premiums and payoffs for employee injuries. As a result, means are needed for replacing the human labor heretofore required.

The meat industry is by in large now mechanized and automated. The missing link so to speak is the loading of meat onto trucks at the packing house and the unloading of meat from the trucks at the grocery store or other wholesale or retail meat outlet. The subject invention fills the missing link and allows for full mechanization and automation of the meat handling at the packing house and at the grocery store.

The device may be portable and it is compact, and easily stored either at the packing house or on a van truck for use in unloading the meat at a wholesale or retail outlet which does not have its own unloading means.

The device is operated by means of an electric or other suitable motor and hydraulic or pneumatic cylinders.

The device is simple and may be operated by anyone with no special skills or training necessary. In addition because of its basic simplicity, the device is essentially maintenance free and those acts of maintenance required can be simply effected by any person operating the machine without any special training or disassembly of the unit being necessary.

Accordingly, it is an object of the subject invention to provide a device for loading or unloading and conveying meat or other objects which obviates the necessity for lifting and carrying by human labor.

Another object of the subject invention is to provide a portable device for loading and unloading meat or other objects from and onto trucks and other vehicles and to and from remote locations.

Still another conveyor of the subject invention is to provide a device for loading and unloading meat or other objects from and onto trucks or other vehicles and to and from remote locations which is compact, and can be easily stored either on the truck or other vehicle or at the packing house or plant.

A further object of the subject invention is to provide a device for loading and unloading meat and other objects from and onto trucks or other vehicles which is easily extended to the end of the vehicle being loaded or unloaded and which is easily retracted as necessary during the loading and unloading.

Still another object of the subject invention is to provide a device for loading or unloading meat or other objects from and onto trucks or other vehicles and to and from remote locations including a continuous conveyor belt which is readily extended into or retracted from the vehicle being loaded or unloaded or to and from the remote location without any slack in the belt occurring.

Yet another object of the subject invention is to provide a device for loading and unloading meat from and onto trucks or other vehicles and to and from remote locations including a continuous conveyor belt which is extended or retracted from the truck or remote location with means for supporting the conveyor belt while it is extended.

A further object of the subject invention is to provide a device for loading or unloading meat or other objects from or onto trucks or other vehicles and to and from remote locations including a continuous conveyor belt which can be extended into the truck or other vehicle or to and from the remote location and pivoted to the side of the truck or other vehicle being loaded or unloaded or along an arc at the remote location.

Still one more object of the subject invention is to provide a device for loading or unloading beef or other objects from trucks or other vehicles and to and from remote locations including adjustable means which can be elevated or lowered at the point of loading or unloading for conveying the meat or other heavy objects to or from the conveyor belt.

Still another object of the subject invention is to provide a device for loading and unloading meat or other objects to or from trucks or other vehicles and to and from remote locations including pneumatic means for extending or retracting the conveyor belt.

Yet another object of the subject invention is to provide a device for loading or unloading meat or other heavy objects to or from trucks or other vehicles including hydraulic means for extending or retracting the continuous conveyor belt.

Yet one more object of the subject invention is to provide a device for loading or unloading meat or other heavy objects to or from trucks or other vehicles which device is constructed of materials that can be easily cleaned and sterilized for use in loading or unloading meat and other comestibles while complying with the sanitary laws and regulations.

Yet another object of the subject invention is to provide a device for loading or unloading meat or other heavy objects to or from trucks or other vehicles which is easily operated and maintained without requiring skilled labor.

The above and other objects and features of the invention will become apparent from the following detailed description taken in connection with the accompanying drawings in which.

Figure 1:
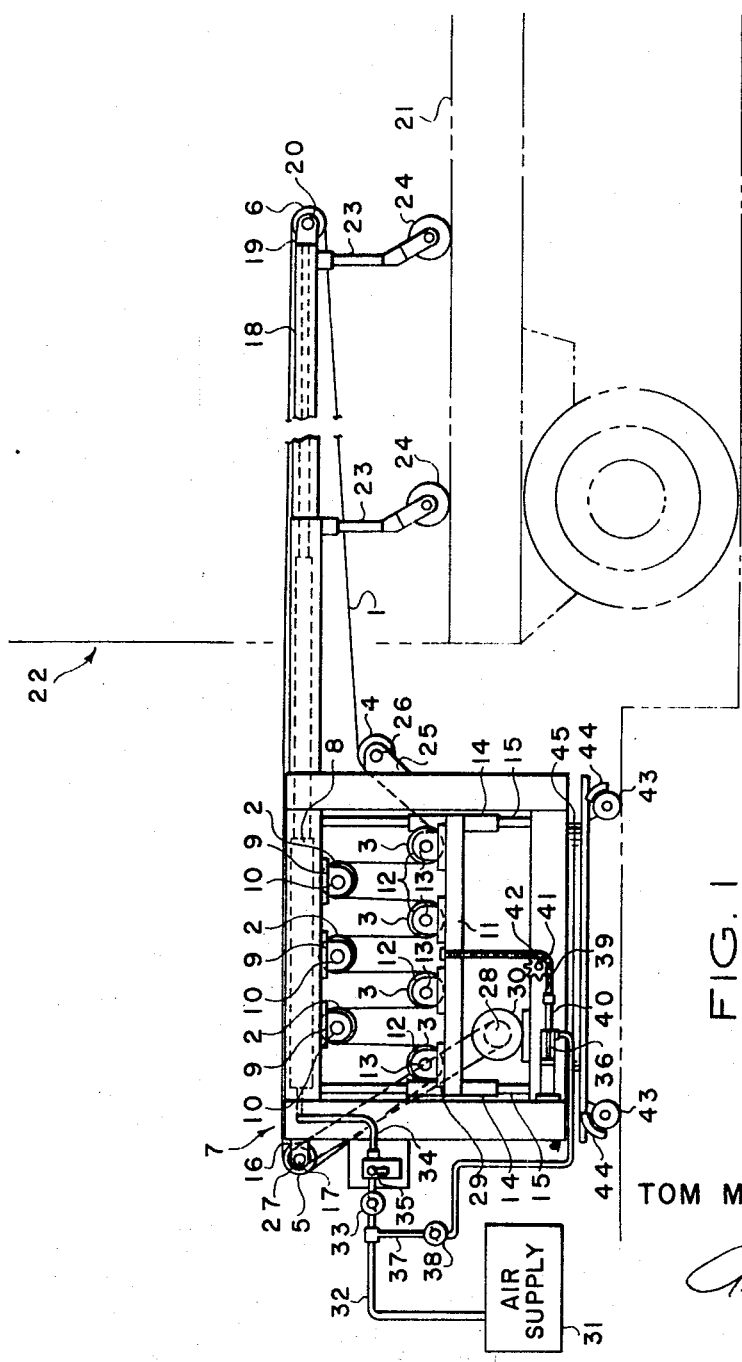
FIG. 1 is a side view of the invention showing the continuous conveyor belt partially extended onto the bed of a truck.

Referring to the drawings, the conveyor belt 1 is shown. The belt may be any suitable belt such as a chain link belt. For use in the food industry it is most desirable to have the belt constructed of stainless steel which may be easily cleaned and sterilized.

The belt 1 is rotated by means of wheels or sprockets 2, 3, 4, 5, and 6.

The continuous conveyor belt 1 and the wheels or sprockets 2, 3, 4, 5, and 6 are mounted in or on the compact unit 7.

Also mounted within the compact unit 7, is telescoping cylinder 8. Telescoping cylinder 8 may be pneumatically or hydraulically controlled.

Sprockets or wheels 2 are rotatably mounted in the top portion of compact unit 7 by means of brackets 9 and pins or axles 10.

Wheels or sprockets 3 are rotatably mounted on platform 11 by means of brackets 12 and pins or axles 13. The platform 11 is supported at its ends by the cylinder 14 which move up and down the columns or guide rails 15 to take up slack in the continuous conveyor belt 1. Instead of cylinders 14 brackets and wheels or other suitable means traveling on guides 15 may be used.

The wheel or sprocket 5 is rotatably mounted on the back of the compact unit 7 by means of the bracket 16 and the axle or pin 17.

Wheel or sprocket 6 is rotatably mounted to the front end of the telescoping conveyor belt support 18 by means of the bracket 19 and the axle or pin 20. The extended conveyor belt is supported on the bed 21 of the truck 22 or on whatever surface the belt is extended over by means of the columns or legs 23 and the rollers 24.

A column or leg 23 with a roller 24 is mounted at the end of each section of the telescoping belt support 18. The columns or legs 23 are of the type which may be mechanically adjusted for different heights.

Means may be provided for adjusting the elevation and angle of the unit 7, and thereby the elevation and angle of the conveyor belt 1 may be adjusted.

The wheel or sprocket 4 is rotatably mounted at the front of the compact unit 7 by means of the bracket 25 and the pin or axle 26.

Motion is imparted to the continuous conveyor belt 1 by means of pulleys 27 and 28, belt 29, and motor 30. The motor 30 may be any suitable motor of sufficient horsepower either electric or powered by any other suitable means.

The continuous conveyor belt 1 is extended by means of the telescoping cylinder 8. The telescoping cylinder 8 may be pneumatically or hydraulically powered. In the embodiment shown, the telescoping cylinder 8 is pneumatically powered.

The telescoping cylinder 8 is connected in FIG. 1 to air supply 31 through air line 32 which acts through regulator 33 to activate line 34 for extending the telescoping air cylinder 8. Line 34 is closed or opened by means of stop cock or valve 35.

Cylinder 36 which may be a pneumatic or hydraulic cylinder is shown as a pneumatic cylinder connected to the air supply 31 by means of line 37 which passes through regulator valve 38. Air cylinder 36 is a tension cylinder which acts to pull down the platform 11 by means of the chain 39 and the piston 40. The chain 39 coacts with sprocket wheel 41 which is mounted near the bottom of compact unit 7 and rotates on the axle or shaft 42.

In operation the air pressure in the pneumatic cylinder 8 is kept higher than the air pressure in the tension cylinder 36 to extend the air cylinder 8. When the pneumatic cylinder 8 is being extended for instance, the pneumatic cylinder 8 may be maintained at 80 p.s.i. with the tension cylinder 36 being maintained at 60 p.s.i. The pneumatic cylinder 8 and the tension cylinder 36 are opposing cylinders. When the pneumatic cylinder 8 extends, the platform 11 is elevated and the continuous conveyor belt 1 and horizontal extension guide or telescoping belt support 18 extend thus pulling out the chain 39 and piston 40. The pneumatic cylinder 8 is retracted by increasing the pressure on the tension cylinder 36 above that on the pneumatic cylinder 8 or decreasing the pressure on the pneumatic cylinder 8 below that of the tension cylinder 36 so that the tension cylinder 36 overcomes the pneumatic cylinder 8. Then the tension cylinder 36 pulls in the chain 39 and the piston 40 thus lowering the platform 11 and taking up the slack in the continuous conveyor belt 1 as the pneumatic cylinder 8 is retracted.

The compact unit 7 is mounted on wheels 43 provided with mechanical stops 44. The unit 7 rotates on pivot platform 45. As noted, means may be provided for adjusting the elevation and angle of unit 7.

Scissor lifts 46 may be provided at the back of the unit and at the extended ends of the continuous belt 1. The scissors lifts 46 are moveably mounted for portability on wheels 47. The scissors lifts 46 are operated by means of cylinders 48 which may be hydraulically or pneumatically controlled. The scissors lifts 46 are used for raising or lowering the objects to be conveyed onto the continuous conveyor belt 1 and for raising or lowering the objects being conveyed at their destination to a hook on a truck or other suitable receptacle.

The side of beef 49 is shown being raised onto the continuous conveyor belt 1. Sides of beef 50 and 51 are shown being conveyed to the destination. The side of beef 52 is shown being raised for possible hooking at the inside of the truck.

Figure 3:
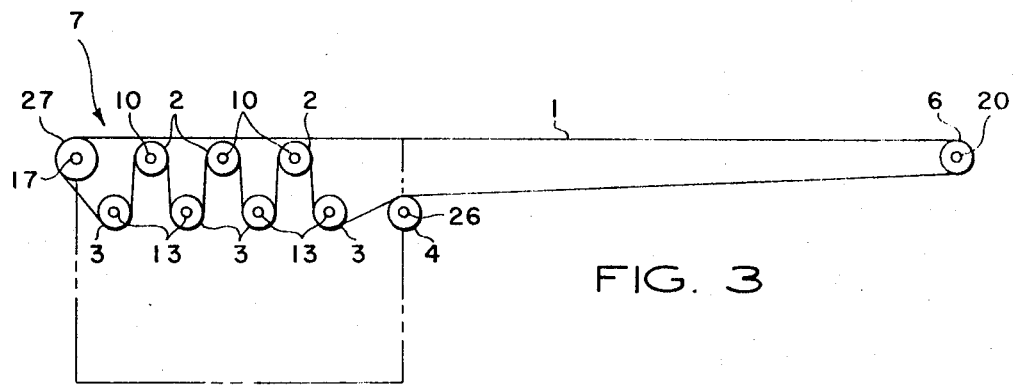
FIG. 3 is a view showing the device of the invention in fully extended position.

FIG. 3 shows the continuous conveyor belt 1 in fully extended position.

Figure 4:
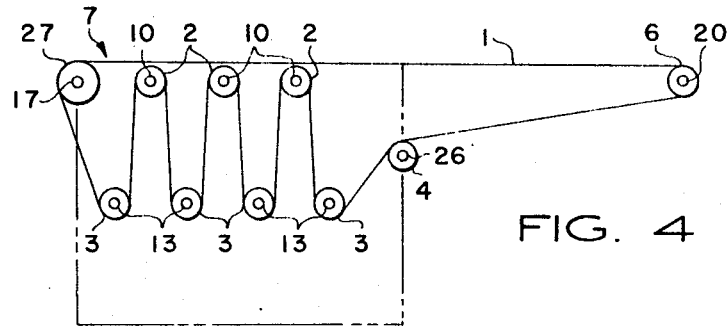
FIG. 4 is a view of the device of the invention in partially extended position.

FIG. 4 shows the continuous conveyor belt 1 in partially extended position.

Figure 5:
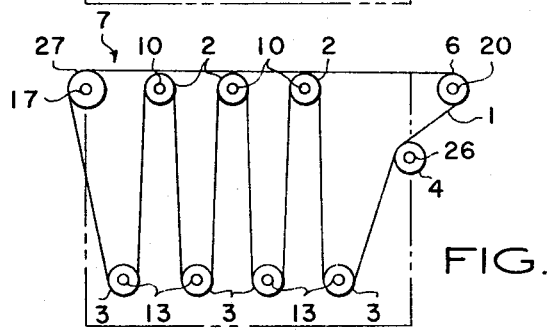
FIG. 5 is a view of the device of the subject invention in fully retracted position.

FIG. 5 shows the continuous conveyor belt 1 in fully retracted position.

Figure 6:
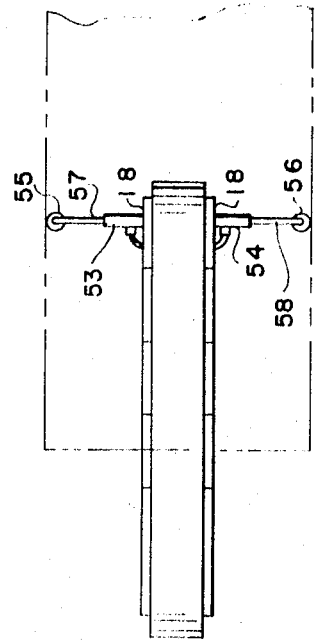
FIG. 6 is a view showing means for rotating the end of the belt extended into a truck from one side of the truck to the other side.
Figure 2:
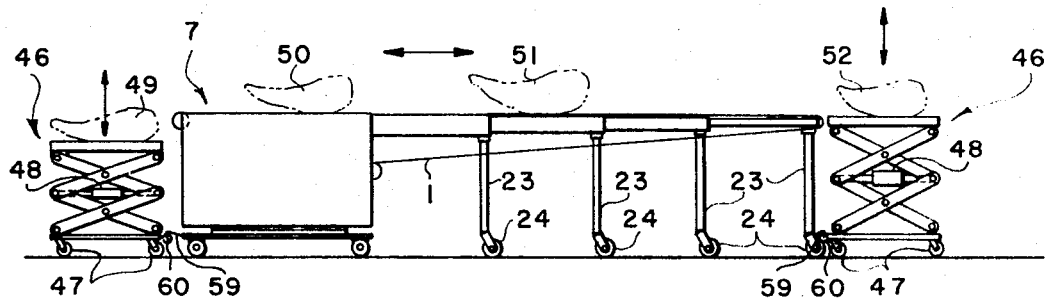
FIG. 2 is a side view of the invention showing means for raising and lowering the objects being conveyed to and from the conveyor belt.

FIG. 6 shows means for automatically moving the extended end of the conveyor belt from one position to another; for example, from one side of a van truck to the other side of a van truck.

The pivoting or rotating means of FIG. 6 includes two pneumatic or hydraulic cylinders 53 and 54 which may be pivotally or foldably mounted with a spring load near the extended ends of the continuous conveyor belt support or horizontal extension guide 18. Wheels 55 and 56 allow for retraction along the side of the truck desired.

Since the compact unit 7 is rotatably mounted on pivot mount 45, the extended end of the continuous conveyor belt 1 may be readily moved from one side of a truck to the other side by manually pushing the belt support or horizontal extension guide 18. However, the pneumatic or hydraulic cylinders 53 and 54 with pistons 57 and 58 allow this operation to be performed automatically and without the exertion of any physical effort. By setting the pressure in pneumatic or hydraulic cylinder 53 higher than the pressure in pneumatic or hydraulic cylinder 54, the piston 57 is extended automatically pushing the belt support or horizontal extension guide 18 towards the side of the truck or van opposite piston 58. By setting the pressure in pneumatic or hydraulic cylinder 54 higher than the pressure in pneumatic or hydraulic cylinder 53, the piston 58 is extended automatically pushing the belt support or horizontal extension guide 18 towards the side of the truck or van opposite piston 57.

Scissor lifts 46, if provided, may be attached to the unit 7 by hooks 59 and eyes 60 or other suitable means.

The device of the subject invention may be constructed to extend any desired length; however, for use in van trucks for the conveyance of meat typically 35 to 37 feet is the required length.

Although a preferred embodiment has been shown, it is intended that variations of the invention within the scope of the description in the above specification be included.

What I claim as my invention and desire to secure by Letters Patent of the United States is:

1. A device for loading and unloading objects including in one unit means for conveying the objects from one point to another point, said means including a continuous conveyor belt and means for imparting motion to the continuous conveyor belt, said conveying means being extensible to a remote location and retractable back to the original position without any slack occurring in the conveyor belt during retraction and extension, in which the means for extending the continuous conveyor belt includes at least one telescoping cylinder and including telescoping horizontal extension guides for supporting the continuous conveyor belt when it is extended, in which the means for retracting the conveyor belt, taking up the slack in the conveyor belt as the belt is retracted, and playing out additional conveyor belt as the belt is extended includes rotating wheels on which the belt is stored and from which the belt is fed, some of said wheels being stationary and the others of said wheels moving vertically to and from the stationary wheels as the belt is extended and retracted respectively, and in which the wheels moving in a vertical plane are mounted on a platform and are moved from the stationary wheels by means of at least one tension cylinder connected to the platform.

2. A device for loading and unloading objects as described in claim 1 in which extension of the continuous conveyor belt is effected by setting the pressure on the telescoping cylinders at a higher pounds per square inch than the pressure on the tension cylinders so that the platform is moved vertically towards the stationary wheels thus playing out conveyor belt as the telescoping horizontal extension guide is extended.

3. A device for loading and unloading objects as described in claim 1 in which retraction of the continuous conveyor belt without slack is effected by maintaining the pressure on the telescoping cylinder at a lower pounds per square inch than the pressure on the tension cylinder so that the platform is moved vertically away from the stationary wheels thus taking up conveyor belt as the telescoping horizontal extension guide is retracted.

4. A device for loading and unloading objects as described in claim 1 in which the telescoping and tension cylinders are pneumatic cylinders.

5. A device for loading and unloading objects as described in claim 1 in which the telescoping and tension cylinders are hydraulic cylinders.

6. A device for loading and unloading objects as described in claim 1 including means automatically adjustably raised and lowered for receiving the objects to be conveyed and carrying them to the conveying means.

7. A device for loading and unloading objects as described in claim 1 including means automatically adjustably raised and lowered for receiving the objects being conveyed at their destination and lifting them into unloading position.

8. A device for loading and unloading objects as described in claim 1 including means for pivoting the conveying means so that the objects being conveyed can be loaded and unloaded at different points along the arc of the extended limit of the conveying means.

9. A device for loading and unloading objects as described in claim 1 in which the continuous conveyor belt is a chain belt.

10. A device for loading and unloading objects as described in claim 9 in which the wheels are sprockets with teeth which engage the chain belt.

11. A device for loading and unloading objects as described in claim 1 in which the means for imparting motion to the continuous conveyor belt includes a motor driving a pulley coacting with a wheel on which the continuous conveyor belt is mounted.

12. A device for loading and unloading objects as described in claim 11 in which the pulley is driven by means of a drive belt which engages the motor drive shaft.

13. A device for loading and unloading objects as described in claim 1 in which portability of the device is provided by wheels mounted on the bottom of the device.

14. A device for loading and unloading objects as described in claim 13 including mechanical stops for keeping the wheels mounted to the bottom of the device from rotating when it is desired that the device be stationary.

15. A device for loading and unloading objects as described in claim 1 including legs extending downward from the end of each telescoping horizontal extension guide section for supporting the telescoping extension guides when they are extended.

16. A device for loading and unloading objects as described in claim 15 including a roller on the end of each leg extending from a telescoping horizontal extension guide section.

17. A device for loading and unloading objects as described in claim 16 including a swivel mount for the device so that in extended position the extended end of the continuous conveyor belt may be readily moved from side to side on the rollers at the ends of the legs extending from the telescoping horizontal extension guide sections.

18. A device for loading and unloading objects as described in claim 17 including cylinder means fixed to the extended end of the telescoping horizontal extension guide section to automatically move the extended end of the continuous conveyor belt from one side to the other.